(12) United States Patent
Stanley

(10) Patent No.: US 7,554,820 B2
(45) Date of Patent: Jun. 30, 2009

(54) SERIES RESONANT DC-DC CONVERTER

(75) Inventor: Gerald R. Stanley, Osceola, IN (US)

(73) Assignee: Harman International Industries, Incorporated, Northridge, CA (US)

( * ) Notice: Subject to any disclaimer, the term of this patent is extended or adjusted under 35 U.S.C. 154(b) by 193 days.

(21) Appl. No.: 11/231,160

(22) Filed: Sep. 20, 2005

(65) Prior Publication Data

US 2007/0064451 A1    Mar. 22, 2007

(51) Int. Cl.
H02M 3/335 (2006.01)
H02H 7/122 (2006.01)

(52) U.S. Cl. .................. 363/17; 363/21.02; 363/56.08; 363/56.11

(58) Field of Classification Search ............... 363/21.02, 363/56.05, 56.08, 56.11, 16, 17, 24–25, 56.02, 363/56.03, 56.04, 98, 132–134
See application file for complete search history.

(56) References Cited

U.S. PATENT DOCUMENTS

| | | | |
|---|---|---|---|
| 1,752,247 A | | 3/1930 | Fitz Gerald |
| 1,902,495 A | | 3/1933 | Fitz Gerald |
| 4,559,590 A | * | 12/1985 | Davidson ............... 363/21.02 |
| 4,672,528 A | * | 6/1987 | Park et al. ............... 363/98 |
| 4,694,383 A | * | 9/1987 | Nguyen et al. ............... 363/17 |
| 5,198,969 A | | 3/1993 | Redl et al. |
| 5,646,835 A | * | 7/1997 | Katcha ............... 363/98 |
| 5,767,744 A | | 6/1998 | Irwin et al. |
| 5,777,859 A | * | 7/1998 | Raets ............... 363/24 |
| 6,160,374 A | * | 12/2000 | Hayes et al. ............... 320/108 |
| 6,344,979 B1 | * | 2/2002 | Huang et al. ............... 363/16 |
| 6,366,474 B1 | * | 4/2002 | Gucyski ............... 363/20 |

(Continued)

FOREIGN PATENT DOCUMENTS

CN    1523746 A    8/2004

(Continued)

OTHER PUBLICATIONS

M. Ehsani, P. Le Polles, M. S. Arefeen, I. J. Pitel, and J. D. Van Wyk; "Computer-Aided Design and Application of Integrated LC Filters"; Jan. 1996; IEEE; pp. 182-190.*

(Continued)

*Primary Examiner*—Jessica Han
*Assistant Examiner*—Emily Pham
(74) *Attorney, Agent, or Firm*—Brinks Hofer Gilson & Lione

(57) ABSTRACT

A series resonant Dc-DC converter powers an audio amplifier as a load. The series resonant DC-DC converter may include a power input stage, a switching stage, a series resonant stage, a transformer stage and a power output stage. The series resonant DC-DC converter further may include a clamping stage and a leakage inductance canceling stage. The clamping stage may operate to clamp an excess voltage generated at least by a leakage inductance and a parasitic capacitance. The leakage inductance canceling stage may operate to generate a voltage drop corresponding to a voltage drop generated by the leakage inductance. The generated voltage drop may be subject to clamping. The clamping stage may operate under all load conditions without any influence of the leakage inductance. As a result, the series resonant converter may achieve improved load regulation.

33 Claims, 7 Drawing Sheets

U.S. PATENT DOCUMENTS

| | | | |
|---|---|---|---|
| 6,477,064 | B1 | 11/2002 | Weng et al. |
| 6,535,399 | B2 * | 3/2003 | Gu .............................. 363/17 |
| 6,650,551 | B1 | 11/2003 | Melgarejo |
| 6,674,659 | B2 | 1/2004 | Zametzky |
| 7,136,293 | B2 * | 11/2006 | Petkov et al. ............... 363/126 |
| 2002/0030451 | A1 * | 3/2002 | Moisin ....................... 315/219 |
| 2005/0041439 | A1 | 2/2005 | Jang et al. |

FOREIGN PATENT DOCUMENTS

| | | |
|---|---|---|
| EP | 1 241 777 A2 | 2/2002 |
| GB | 2 265 265 A | 9/1993 |
| JP | 05015149 A | 1/1993 |

OTHER PUBLICATIONS

UK Search Report, Nov. 3, 2006, Corresponding UK Patent Application No. 0618340.4.

German Office Action, Apr. 7, 2008, Corresponding DE Patent Application No. 10 2006 041 545.0.

Chinese Office Action, Apr. 4, 2008, Corresponding Patent Application No. CN2006101538267.

* cited by examiner

SERIES RESONANT DC-DC CONVERTER

BACKGROUND OF THE INVENTION

1. Technical Field

The invention relates to a DC-DC converter and in particular, a series resonant DC-DC converter with improved load regulation.

2. Related Art

A DC-DC converter supplies a load with suitable power by stepping up or down a source voltage. A different load requires a different level of voltage. To change the level of voltage, the DC-DC converter incorporates a switching circuit that is turned on and off according to a predetermined duty cycle. The switching operation of the switching circuit often results in switching losses, which affect power efficiency of the DC-DC converter. A series resonant circuit may be used with the DC-DC converter ("series resonant DC-DC converter") to substantially reduce the switching losses.

The series resonant DC-DC converter may include a transformer that transfers energy to a load. The transformer may include a parallel resonant circuit. The parallel resonant circuit may be formed from a parasitic capacitance and leakage inductance developing on a primary winding and/or a secondary winding of the transformer. The parallel resonant circuit may be naturally formed and transparent. The parallel resonant circuit may generate additional overshoot and/or ringing voltages. The additional overshoot and/or ringing voltages may result in excessive peak voltages. The excessive peak voltages may damage circuit elements connected to the transformer, such as a rectifier and a load. In addition, energy generated by the parallel resonant circuit may be wasted.

The series resonant DC-DC converter is suitable for audio applications because it may be lightweight and may have a high efficiency. In audio applications, a load is often an audio amplifier. The audio amplifier, as the load operates in a broad range, frequently operates at a reduced signal level. The peak voltages generated as a result of the parallel resonant circuit may severely damage a load such as an audio amplifier. Accordingly, there is a need for a series resonant DC-DC power converter capable of improved voltage regulation under all load conditions.

SUMMARY

A series resonant DC-DC converter includes a power input stage, a switching stage, a series resonant stage, a transformer stage, a clamping stage and an output stage. The power input stage may supply a rectified AC voltage. The power input stage may charge a storage capacitor with the rectified voltage. The switching stage may control a switch to turn on and off according to a predetermined switching cycle. The switching cycle may include a first interval that turns on the switch, and a second interval that turns off the switch prior to a next switching cycle of another switch. The series resonant stage is coupled to the switching stage and may include a capacitor and an inductor connected in series. The transformer stage includes a primary winding and a secondary winding. The primary winding may be connected in series with the series resonant stage. The clamping stage may be coupled in series between the series resonant stage and the transformer stage. The clamping stage may operate to clamp an excess voltage. The output stage is coupled to the secondary winding of the transformer stage. The output stage is configured to output a DC voltage suitable for a load.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A series resonant DC-DC converter may be used to supply power in audio applications. A power supply may dominate the overall size and weight of an audio system.

The series resonant DC-DC converter may be configured as a low cost and light weight power supply. This feature of the series resonant DC-DC converter has particular advantages in audio applications.

A series DC-DC converter having a bridge configuration at a power input stage is a popular form of a power supply and is often referred to as a bridge converter. The bridge converter may be a switch-mode power supply that includes a switching circuit. The switching circuit may include two switches that form a half-bridge converter. The switching circuit may include four switches that form a full-bridge converter. A full-bridge converter is useful in handling high power supply applications since it normally supplies twice as much power as that of a similar half-bridge converter.

Figure 1:
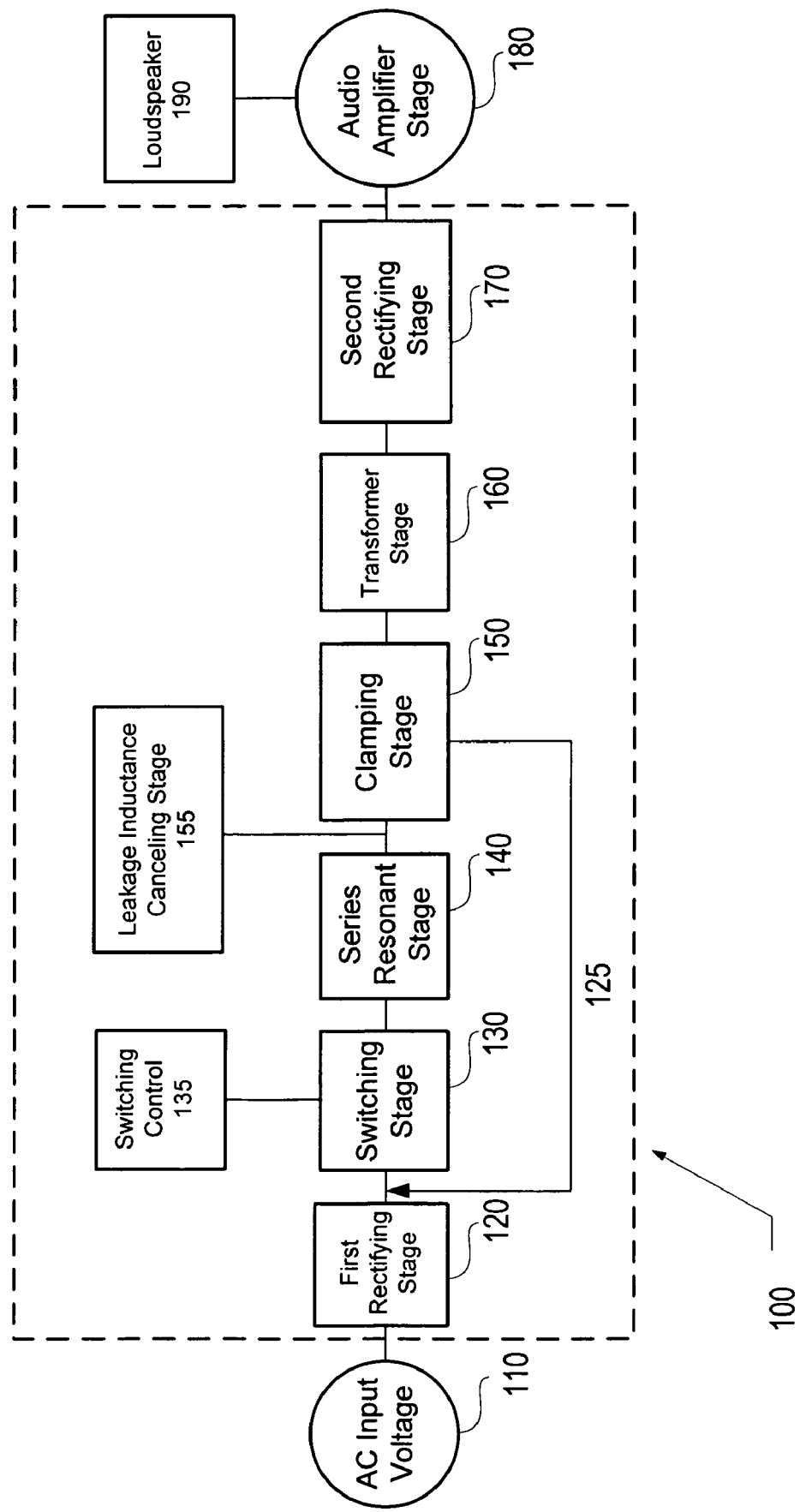
FIG. 1 is a block diagram of a bridge series resonant DC-DC converter.

FIG. 1 is a block diagram of an example bridge converter 100. The bridge converter 100 uses an AC input voltage 110 to power an audio amplifier stage 180. A loudspeaker 190 may be connected to the audio amplifier stage 180. The bridge converter 100 includes a first rectifying stage 120, a switching stage 130 and a series resonant stage 140. The bridge converter 100 further includes a clamping stage 150, a leakage inductance canceling stage 155, a transformer stage 160, and a second rectifying stage 170. The AC input voltage 110 may be in a predetermined range such as from about 100V to 240V AC. The first rectifying stage 120 rectifies the AC input voltage to be provided to the switching stage 130. The switching stage 130 may include two switches or four switches. As noted above, the bridge converter 100 may be a half-bridge converter or a full-bridge converter, depending on the structure of the switching stage 130.

The switching stage 130 is connected to a switching control stage 135. The switching control stage 135 controls the switches at the switching stage 130 to be turned on and off according to a predetermined duty cycle. For example, for a half-bridge converter, the two switches are controlled to be turned on alternately by the switching control stage 135. For example, the switching control stage 135 may include a pulse width modulation control circuit.

In the switching control stage 135, a determine time interval may be inserted into a switching cycle. During the time interval, none of the switches is turned on. For example, for a half-bridge converter, a first switch is turned on during a half cycle of a switching cycle. Toward the end of the half cycle, the first switch is turned off. During a determined time interval, a second switch is also turned off. The second switch may be turned on when the next half cycle starts. This switching control may allow the bridge converter 100 to operate in a discontinuous conduction mode ("DCM"). The bridge converter 100 may operate with DCM to recover energy from a transformer before the start of a next switching cycle. The DCM operation may allow the switches to operate with a relatively low switching loss condition.

The series resonant stage 140 further allows zero voltage switching. In the series resonant stage 140, impedance may change as a frequency changes. The impedance may change in terms of a magnitude and a phase. As a result, a voltage and a current flowing the series resonant stage 140 may lead or lag each other. This changing phase relationship of the current and the voltage at the series resonant stage 140 allows the switches to be turned off at a zero current crossing and turned on at a zero voltage crossing. Because the switches may be turned off and on at a zero crossing of the current and the voltage, respectively, the switching losses may be substantially minimized.

The clamping stage 150 and the leakage inductance canceling stage 155 may operate to minimize undesirable effects of an undesirable leakage inductance in the transformer stage 160. The clamping stage 150 may include a plurality of diodes. Construction of the clamping stage 150 may include two or more diodes connected in series, a diode bridge circuit, etc. The leakage inductance canceling stage 155 may include an inductor or an equivalent structure. The clamping stage 150 and the leakage inductance canceling stage 155 will be described in detail below.

The transformer stage 160 includes a primary winding and a secondary winding. The AC input voltage 110 may be transferred from the primary winding to the secondary winding and eventually to a load such as the audio amplifier stage 190. The transformer is well known in the art and the structure of the transformer may be described to the extent it is necessary for an implementation of a series resonant DC-DC converter.

Figure 2:
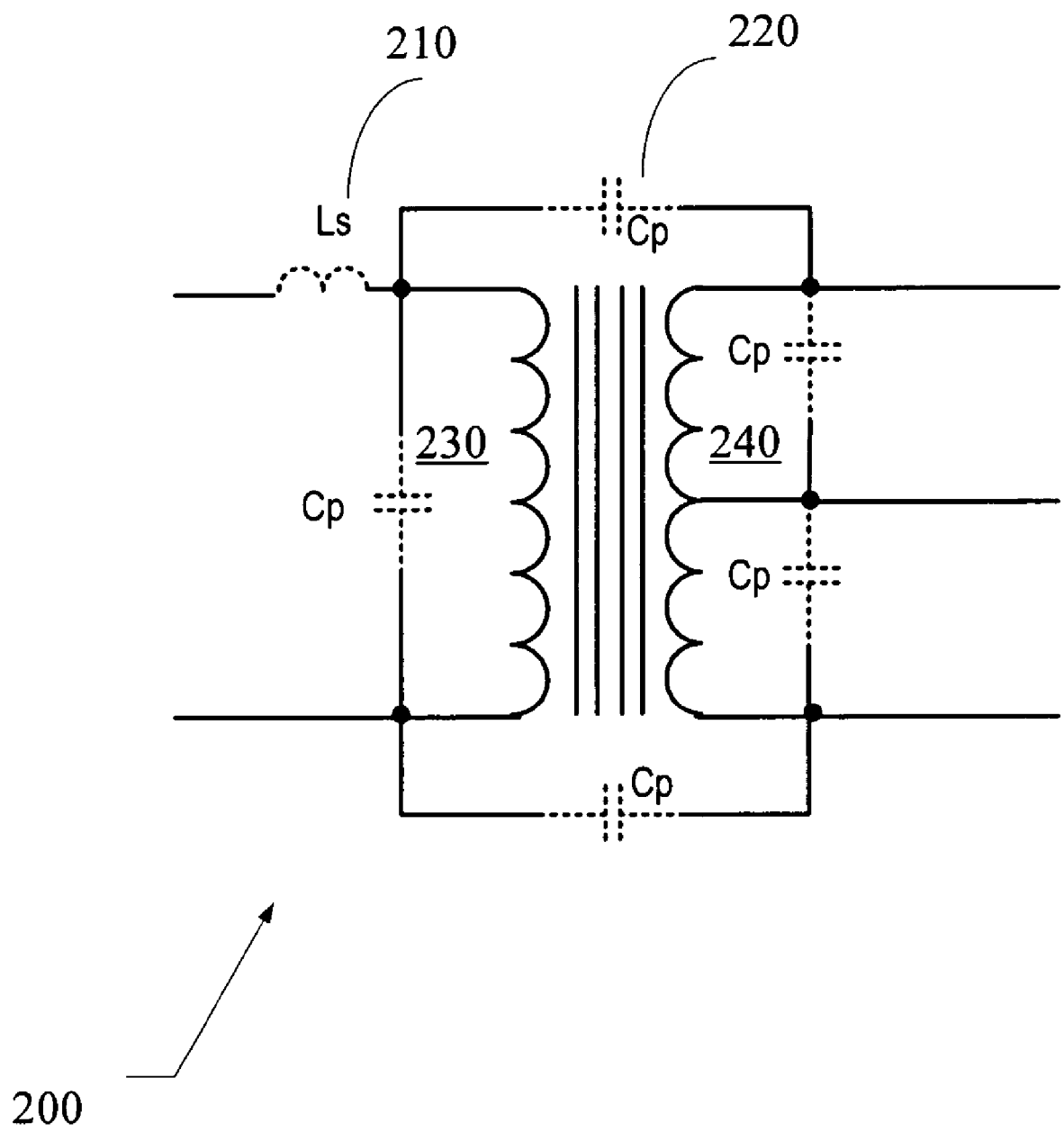
FIG. 2 illustrates an equivalent circuit of a practical transformer.

FIG. 2 illustrates one example transformer 200 that includes a primary winding 230 and a secondary winding 240. An ideal transformer has no leakage inductance and parasitic capacitance. However, in practice, an ideal transformer may not exist. The leakage inductance may develop because the primary winding and the second winding 230 and 240 may not be perfectly linked. The parasitic capacitance also may develop between the primary winding and the secondary winding 230 and 240. FIG. 2 illustrates an equivalent circuit of a practical transformer. That includes a leakage inductor 210 representing leakage inductance Ls and plural parasitic capacitors 220. Due to the leakage inductance Ls and the parasitic capacitance Cp, the transformer 200 may develop parallel resonance. When connected to the series resonant stage 140 of FIG. 1, multiple resonance resulting from series resonant components and parallel resonance components may develop.

In FIG. 1, the second rectifying stage 170 may operate to rectify the voltage at the secondary winding into a DC waveform. When the switches of the switching stage 130 are turned on, the voltage is transferred from the primary winding to the secondary winding of the transformer stage 160. The voltage at the secondary winding may conduct the second rectifying stage 170. As noted above, the current may cross zero before the next switching cycle starts. When the current crosses zero value, the second rectifying stage 170 may cease to conduct and the undesirable reverse recovery current of the second rectifying stage 170 also may be minimized. The rectified voltage may be output to the audio amplifier stage 180.

In the bridge converter 100, the clamping stage 150 and the leakage inductance canceling stage 155 may operate as follows. As noted above in conjunction with FIG. 2, the leakage inductance Ls and the parasitic capacitance Cp may develop a hidden parallel resonance. With the series resonant stage 140, the hidden parallel resonance may cause the bridge converter 100 to be multi-resonant. The parasitic capacitance Cp, capacitance of the second rectifying stage 170, and a capacitor of the series resonant stage 140 may resonate with a net inductance of the leakage inductance Ls and the inductance of the series resonant stage 140. As a result, an additional overshoot or ringing voltage may be generated. The second rectifying stage 170 may respond to peak voltages that result from the overshoot or ringing voltages. The second rectifying stage 170 may be damaged with the peak voltages. Additionally, even if the peak voltages may be rectified, a load may be damaged with excessive voltages. This may be exacerbated at light loads. In audio applications, excessive voltages may damage audio amplifiers which are frequently operating in a reduced signal range.

To prevent the excessive voltage from reaching light loads, the clamping stage 150 may be placed between a DC input supply and the primary winding of the transformer stage 160. In FIG. 1, the DC input supply may be the first rectifying stage 120. The clamping stage 150 may clamp the voltage at the primary winding of the transformer stage 160, thereby blocking peak voltages from reaching the second rectifying stage 170 and the load such as the audio amplifier stage 180. Further, the clamping stage 150 may return parallel resonant energy to the DC input supply over a return line 125, as shown in FIG. 1.

At a high load current, the clamping stage 150 may not operate as intended. The clamping stage 150 may be exposed to a large voltage drop that results from the leakage inductance Ls. The transformer stage 160 may include the transformer 200 (FIG. 2) that may include the leakage inductor 210. The leakage inductor 210 may represent the leakage inductance Ls which develops in the practical transformer. As load current increases, a resonant current flowing through the series resonant stage 140 increases. A large voltage drop may develop across the leakage inductor 210 because the voltage is induced according to a well-known equation, $V=L_s*(di/dt)$. As noted above, the leakage inductance Ls develops because the primary winding 230 and the secondary winding 240 may not be perfectly linked. Thus, the leakage inductance may not contribute to transfer of energy from the primary winding 230 to the secondary winding 240. The leakage inductance may instead store energy and return energy to a voltage source. As a result, the leakage inductance Ls may operate as a series impedance to a primary circuit (the voltage source and the primary winding 230) and a secondary circuit (the secondary winding 240 and a load). As an impedance, the leakage inductance Ls causes voltage drop.

When the clamping stage 150 is exposed to the voltage drop across the leakage inductor 210 (FIG. 2), it may try to short-circuit the leakage inductance Ls. Short-circuiting the leakage inductance Ls may divert the resonant current flowing into the primary winding of the transformer stage 160. Clamping this voltage drop may prevent short-circuiting the leakage inductance Ls. However, the leakage inductance Ls and the voltage drop across the leakage inductor 210 may not be physically present and may be transparent to other circuits such as the clamping stage 150. The leakage inductance canceling stage 155 may produce a voltage equivalent to the voltage drop across the leakage inductor 210 and make the voltage visible for clamping.

The leakage inductance canceling stage 155 may synthesize the invisible voltage drop so that the voltage drop may be subject to clamping. As noted above, the leakage inductance canceling stage 155 may include an inductor that an equivalent voltage drop may be generated. The clamping stage 150 may be connected to the leakage inductance canceling stage 155, so that the voltage drop may be clamped.

In the bridge converter 100, the clamping stage 150 may prevent excessive voltage from damaging the second rectifying stage 170 and the audio amplifier stage 180. Further, the clamping stage 150 may return the parallel resonant energy to the DC input supply. The leakage inductance canceling stage 155 may allow the clamping stage 150 to properly operate under all load conditions. The bridge converter 100 may achieve improved load regulations.

Figure 3:
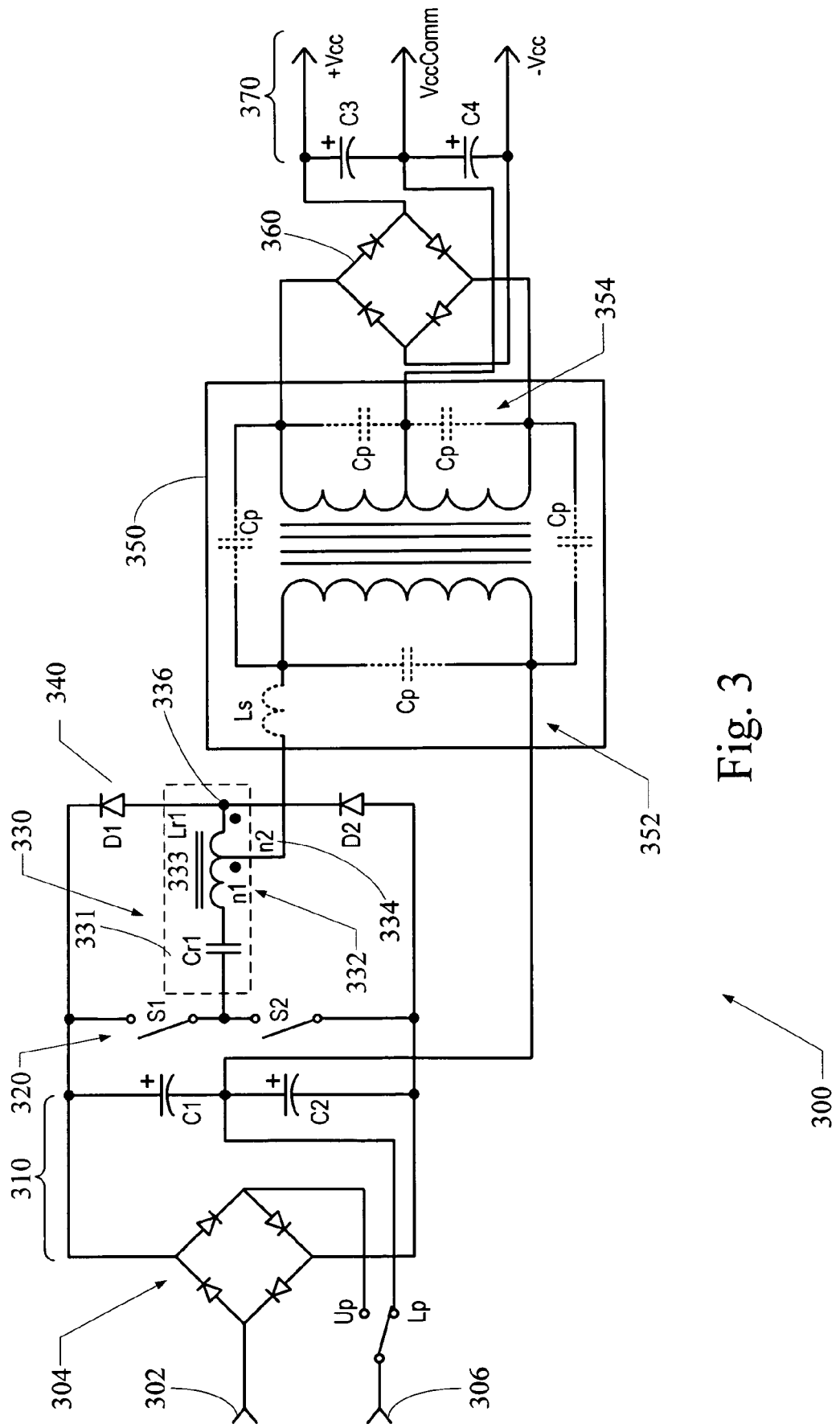
FIG. 3 is a half-bridge series resonant DC-DC converter.

The bridge converter 100 may be implemented with various circuit constructions. FIG. 3 is a circuit diagram of an example half-bridge series resonant DC-DC converter ("bridge converter") 300. The bridge converter 300 includes an input stage 310, a switching circuit 320 and a series resonant circuit 330. The bridge converter 300 further includes clamping diodes 340, a transformer circuit 350, a rectifier circuit 360 and a power output stage 370. The input stage 310 receives an AC voltage input such as the input voltage 110 of FIG. 1 from an input terminal 302. For example, the AC voltage input may range from 100V to 240V. The AC voltage is an input to a bridge circuit 304. The bridge circuit 304 may rectify the AC voltage to be a DC voltage. The input stage 310 may include a control switch 306 that operates to shift between a plurality of positions, such as between an upper position (Up) and a lower position (Lp). In the example of FIG. 3, the upper position (Up) may provide about 200 to 240V and the lower position (Lp) may provide about 100 to 120V.

The bridge circuit 304 may operate as a full-wave rectifier where the control switch 306 is in a first position, such as the upper position (Up). The bridge circuit 304 may rectify the AC voltage input into a DC voltage. The bridge circuit 304 also may operate as a voltage doubler when the control switch 306 is in a second position, such as the lower position (Lp). Capacitors C1 and C2 are connected to the lower position. When the control switch 306 is in the lower position (Lp), the AC voltage input may become a doubled DC voltage that is charged in each capacitor C1 and C2. The capacitors C1 and C2 also may stabilize variations in the output voltage of the bridge circuit 304 by using charges stored therein.

The switching circuit 320 includes two switches S1 and S2. The switches S1 and S2 may be formed with semiconductor devices. The switches S1 and S2 may be formed with a transistor, a diode or both. For example, the switches S1 and S2 may be implemented with an insulated gate bipolar transistor ("IGBT"). Additionally, a diode may be added to the IGBT. Alternatively, the switches S1 and S2 may be formed with a MOSFET (Metal Oxide Semiconductor Field Effect Transistor). The switches S1 and S2 may be activated in time alternation or commutated. When the switch S1 is turned on, the switch S2 may be turned off, and vice versa.

Although not shown, a switching controller may be connected to the switches S1 and S2 to control operations. The switching controller may operate to turn on the switches S1 and S2 alternately. It is desirable that the switching controller controls the switches S1 and S2 such that the bridge converter 300 operates in DCM. For example, the switch S1 is turned on during a half switching cycle and the switch S2 is turned on during a second half of the switching cycle. A determined time interval may be inserted into each half switching cycle. During this time interval, zero voltage may be applied to either the switch S1 or S2. The current may also go to zero value before the next switching cycle starts. The time interval may be inserted toward the end of the half switching cycle when the switch S1 is turned on. Another determined time interval also may be inserted toward the end of the next half switching cycle when the switch S2 is turned on. Thus, the bridge converter 300 may operate in DCM.

The series resonant circuit 330 may be connected to a junction of the switches S1 and S2. The series resonant circuit 330 includes a capacitor 331 and an inductor 333. The series resonant circuit 330 may allow the switches S1 and S2 to be turned on and off under a soft switching condition. The soft switching condition includes the zero current switching and the zero voltage switching, as described in conjunction with FIG. 1.

The inductor 333 may include a first inductor 332 and a second inductor 334. The second inductor 334 may be magnetically coupled to the first inductor 332. As indicated with poling dots of FIG. 3, the first inductor 332 and the second inductor 334 may be coupled to have the same polarity. The first inductor 332 and the second inductor 334 may have a boosting configuration and the voltage across each of the first inductor 332 and the second inductor 334 may be added. In this bridge converter 300, the second inductor 334 may operate as a leakage inductance canceling component. The second inductor 334 may produce a voltage similar to a voltage that is dropped across a primary leakage inductance Ls. In FIG. 3, the primary leakage inductance Ls along with the parasitic capacitance Cp is illustrated in phantom line to indicate that they may be transparent. The clamping diodes 340 (D1 and D2) are connected to the end of the second inductor 334, which is a node 336. The node 336 is a node that may simulate the ideal transformer's primary voltage having no leakage inductance, because of the voltage generated at the second inductor. The clamping diodes 340 may not be exposed to a voltage drop that may develop across a leakage inductor such as the leakage inductor 210 of FIG. 2.

As described in connection with FIG. 1, the clamping diodes 340 (D1 and D2) may clamp a voltage at a primary winding 352 of the transformer 350 to minimize parallel resonant effects in the transformer 350. The voltage developed across the first inductor 332 and the second inductor 334 may be added and clamped by the clamping diodes 340 (D1 and D2). After clamping, excessive voltage as a result of overshoot or ringing voltages may not reach the rectifier circuit 360 and the power output stage 370. Further, the parallel resonant energy may be returned to a DC input supply such as the storage capacitors C1 and C2. The clamping diodes 340 also may clamp the voltage drop that is equivalent to the voltage drop generated by the primary leakage inductance Ls. The second inductor 334 may be configured to produce the equivalent voltage by adjusting a number of turns n2, as will be described in detail below. Due to the node 336, the voltage at the primary winding 352 may be clearly visible for clamping.

The transformer circuit 350 includes the primary winding 352 and a secondary winding 354. One end of the primary winding 352 is connected to the first inductor 332, and the other end of the primary winding 352 is connected to a junction of the capacitors C1 and C2. Accordingly, the bridge converter 300 may be configured to connect the series resonant circuit 330 and the transformer 350. Further, the secondary winding 354 may be connected to the rectifier bridge circuit 360, which is in turn connected to the power output stage 370.

As noted above, the transformer 350 may include a hidden parallel resonant component which is formed with leakage inductance Ls and parasitic capacitance Cp. The leakage inductance Ls may be used along with the first inductor 332 to produce a resonant inductance, which is one of the advantages of a series resonant converter. Although the leakage inductance Ls may be multiple resonant with capacitance Cr1 of the capacitor 331, and the parasitic capacitance Cp, the clamping diodes 340 (D1 and D2) may operate to minimize the multiple resonant effects. Further, the second inductor 334 may operate to make the voltage drop across a leakage inductor representing the leakage inductance Ls visible for clamping. The clamping diodes 340 (D1 and D2) may operate properly at light load and heavy load. As a result, the bridge converter 300 may achieve its intended operations under all load conditions.

In the bridge converter 300, the first and second inductors 332 and 334 have a number of turns n1 and n2, respectively. The windings of the first and second inductors 332 and 334 may be made from two separate windings. Alternatively, the windings of the first and second inductors 332 and 334 may be formed by tapping a single winding. The value n1 of the first inductor 332 may be determined to produce the inductance value of Lr1, which may resonate with the capacitor 331. A resonant frequency may be determined. At the resonant frequency, total impedance of the capacitor 331 and the inductor 333 is zero. The number of turns n2 for the winding of the second inductor 334 may be computed as:

$$n2 = n1 \times Ls/Lr1 \quad (1)$$

where Ls is the leakage inductance and Lr1 is the resonant inductance of the inductor 332.

In equation (1) above, the number of turns n2 is determined based on the number of turns n1 and the ratio of the leakage inductance Ls and the resonant inductance Lr1. The inductance value of the resonant inductor 333 and the leakage inductance Ls may be determined based on voltage across the resonant inductor 333 and the second inductor 334, and the equation, $V = L^*(di/dt)$. The computed value of n2 may not be an integer. The closest integer value may be chosen for use. The number of turns n2 may become a next larger integer by adding more space between the primary winding 352 and the secondary winding 354. Addition of space may increase the leakage inductance Ls. The additional spacing also may reduce the capacitance between the primary and the second windings 352 and 354, thereby reducing a noise current.

In the bridge converter 300, the capacitor 331 is placed between the common node of the switches SI and S2 and the inductor 333. Alternatively, the capacitor 331 may be placed between the common node of the capacitors C1 and C2 and the primary winding 352. This arrangement may place the voltage across the capacitor 331 within a circuit loop that may be clamped to prevent excessive voltages. With this arrangement, the leakage inductance may not affect the clamping diodes 340 (D1 and D2).

In the input stage 310, the control switch 306 may be used to switch between the upper position (Up) and the lower position (Lp). Alternatively, the control switch 306 may not be needed if the AC voltage input is in a predetermined range, such as, about 200 to 240V. In that case, the two capacitors C1 and C2 may be replaced with a single capacitor which may be able to accommodate twice as much voltage as that of the capacitors C1 and C2, alone. The signal capacitor may have one half of the capacitance of the two capacitors C1 and C2.

As noted above, because the bridge converter 300 may provide improved load regulation, it may be more suitable in audio applications. At light load, the bridge converter 300 may be regulated to avoid outputting excessive voltage. An audio amplifier may frequently operate at a reduced signal level. When the bridge converter 300 powers an audio amplifier as a load, it may not damage the audio amplifier with excessive voltage. At high load current situations, the bridge converter 300 also may operate to clamp the excessive voltages.

Figure 4:
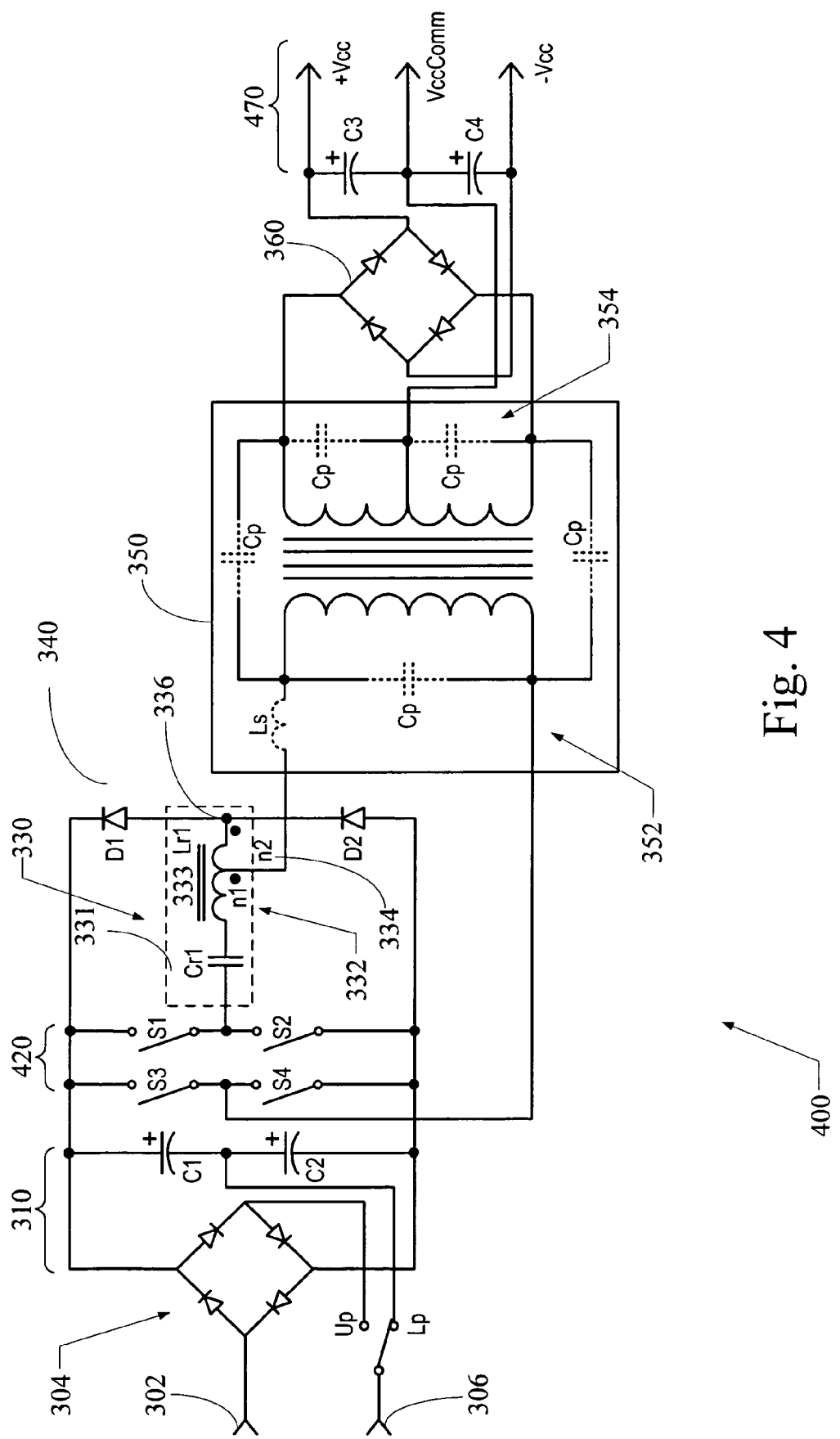
FIG. 4 illustrates a full-bridge configuration of the DC-DC converter of FIG. 1.

FIG. 4 is a circuit diagram of an example full-bridge series resonant DC-DC converter 400 ("full bridge converter"). The full bridge converter 400 may produce twice as much power as that of the half bridge converter 300. The fill bridge converter 400 may include the input stage 310, the series resonant circuit 330, the transformer circuit 350, the rectifier circuit 360 and the output stage 370, which are described above in conjunction with FIG. 3.

The full bridge converter 400 includes a switching circuit 420 that has four switches S1~S4. The switches S1~S4 may operate as follows. The switches S1 and S4 may be turned on simultaneously, and the switches S2 and S3 may be turned on simultaneously. The switches S1 and S4 are turned on during a first half switching cycle. Toward the end of the first half switching cycle, a determined time interval is inserted so that the switches S1 and S4 are both turned off for the time interval prior to the next half switching cycle. The switches S2 and S3 are still off. Thus, the bridge converter 400 may operate in DCM, which minimizes switching loss. During the next half switching cycle, the switches S2 and S3 are turned on and the determined time interval is inserted toward the end of the second half switching cycle.

The full bridge converter 400 may operate properly under all load condition. The clamping diodes 340 (D1 and D2) clamp a voltage at the primary winding of the transformer 350 so that excessive voltage may not damage the rectifier circuit 360 and a load at the power output stage 470. Further, a voltage that may be generated across a leakage inductor such as the leakage inductor 210 of FIG. 2 may be subject to clamping by the clamping diodes 340 (D1 and D2). Like the half bridge converter 300 of FIG. 3, the full bridge converter 400 is suitable for audio applications using audio amplifiers as a load.

Figure 6:
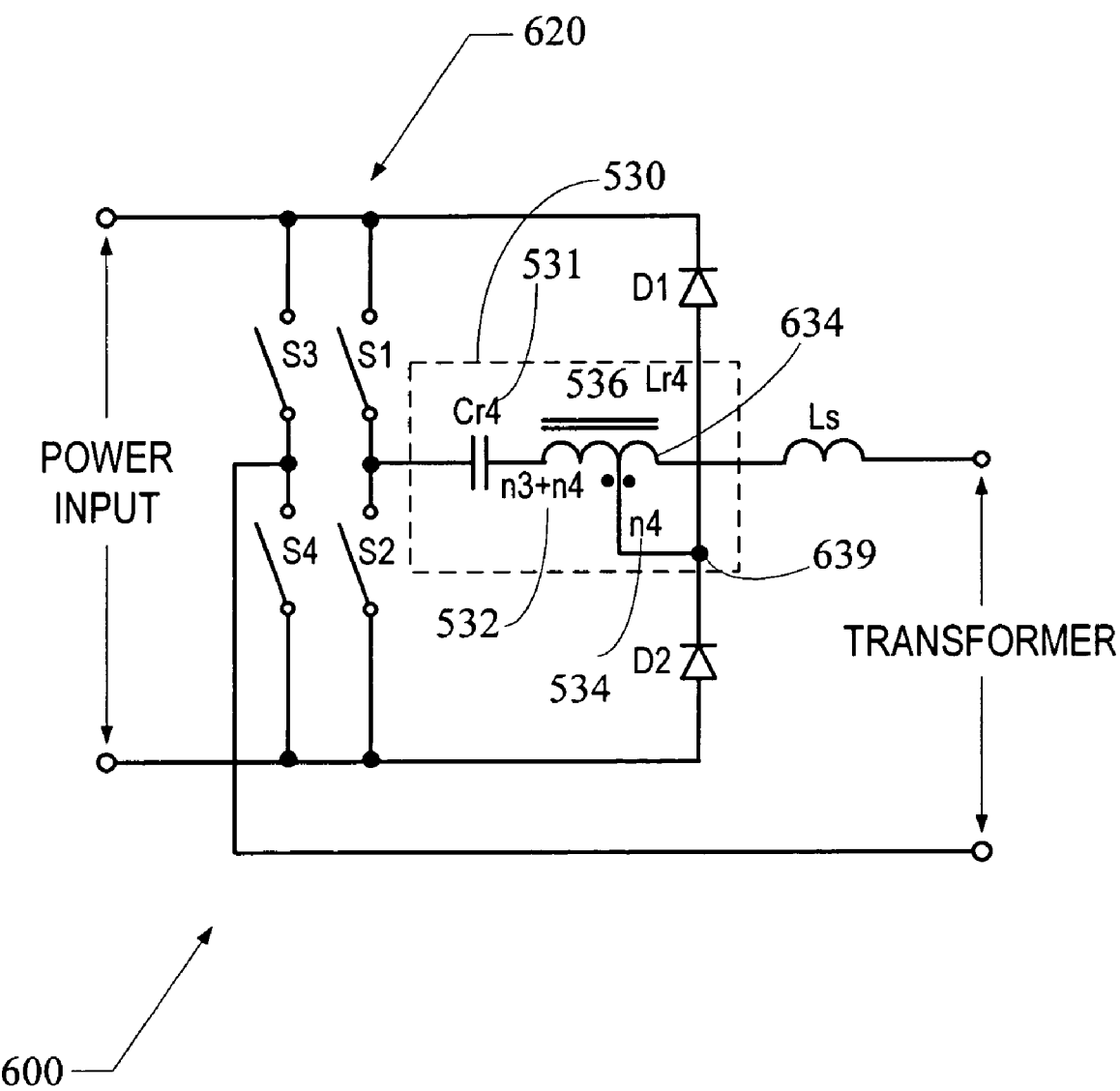
FIG. 6 illustrates a full-bridge configuration of the leakage inductance cancellation block of FIG. 5.
Figure 7:
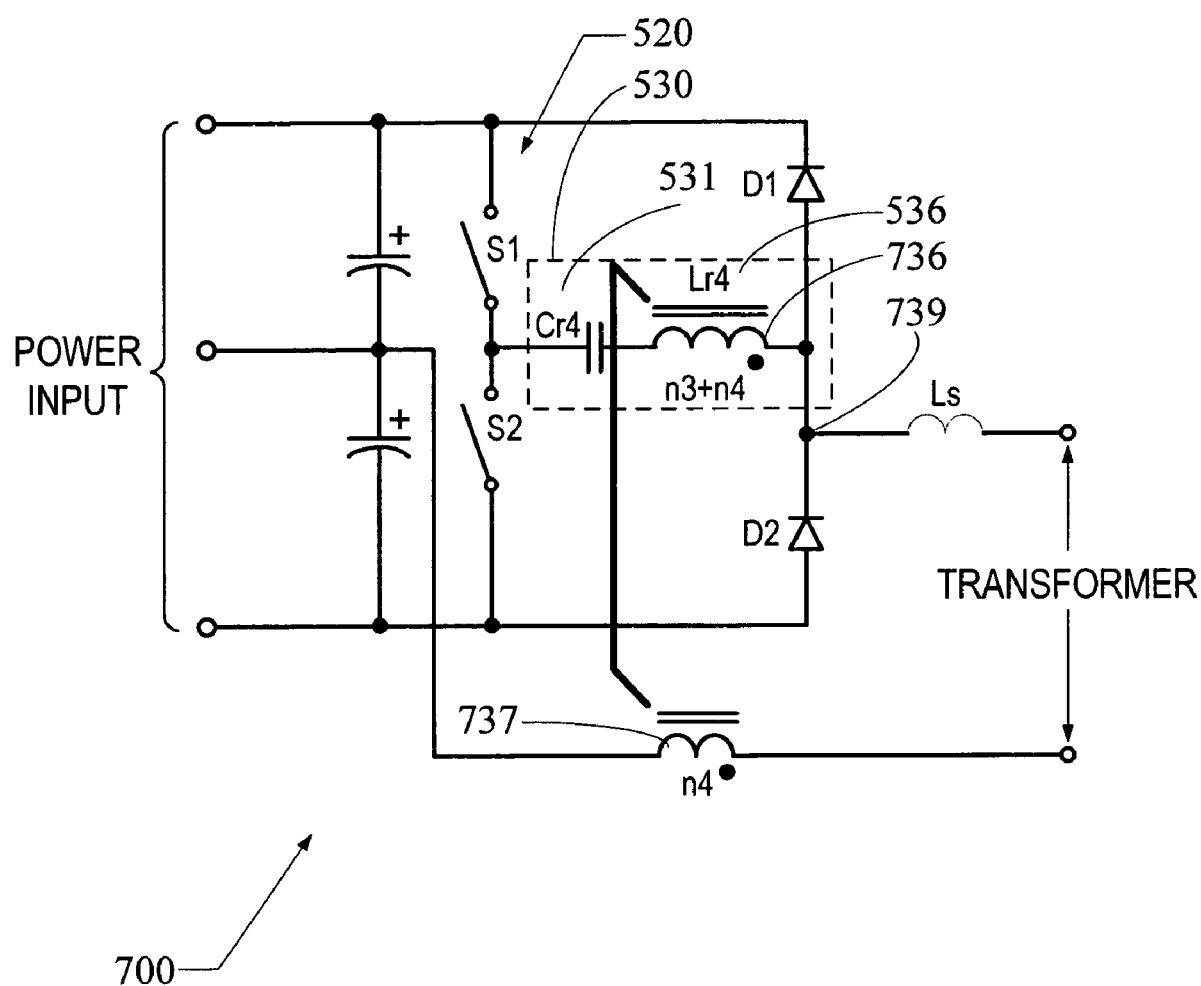
FIG. 7 is another leakage inductance cancellation block for use with a half-bridge series resonant DC-DC converter.

In FIGS. 3 and 4, exemplary circuit construction of half-bridge and full-bridge series resonant DC-DC converters may be described. The described constructions are by way of example only. Those skilled in the art would understand that various other constructions are possible. In addition to the second inductor 334 implementing one example of the leakage inductance canceling stage 155, FIGS. 5-7 illustrate various other implementations of the leakage inductance canceling stage 155 for use with various half-bridge and full-bridge series resonant DC-DC converters and that provides substantially the same operation and advantages.

Figure 5:
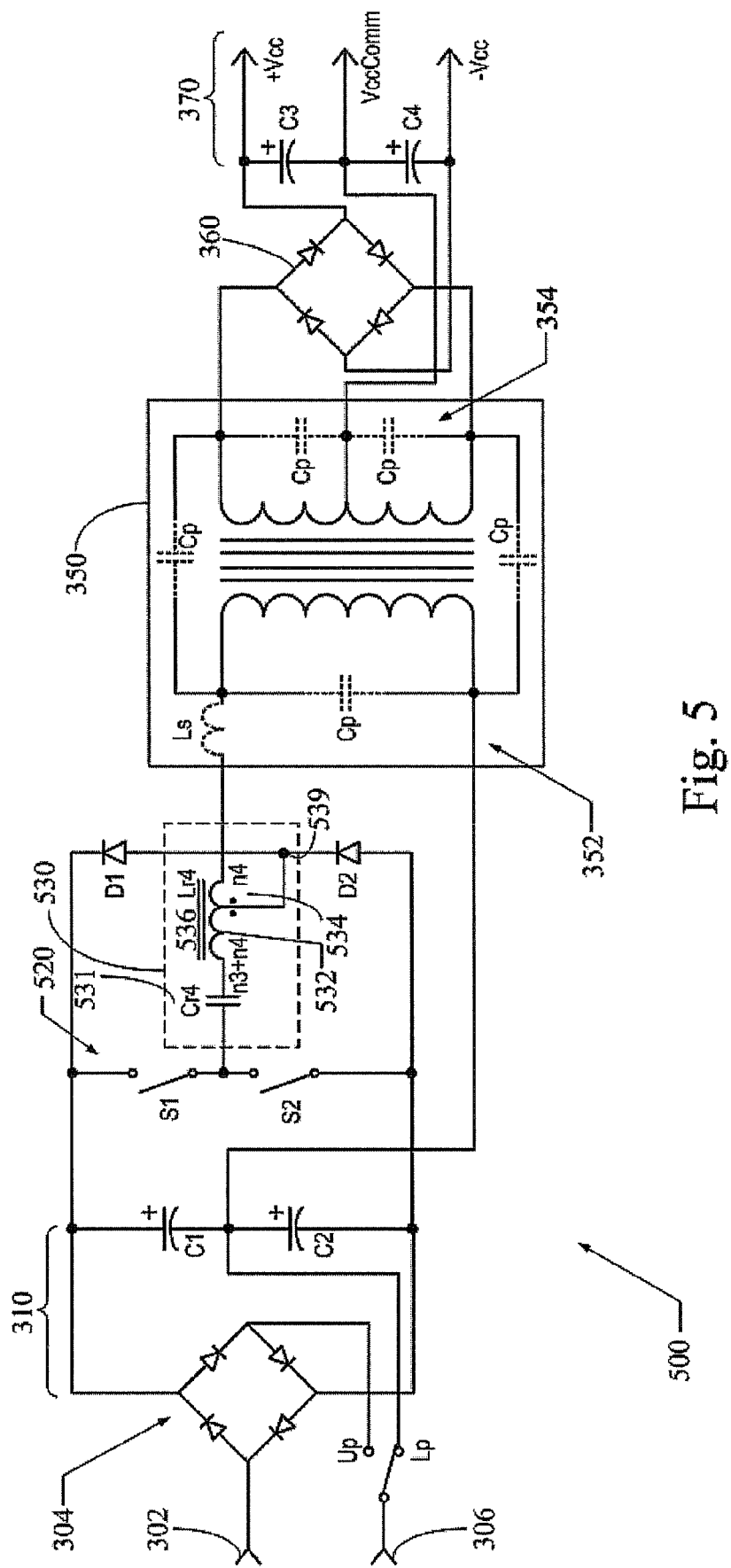
FIG. 5 illustrates a leakage inductance cancellation block for use with a half-bridge series resonant DC-DC converter.

FIG. 5 is a diagram illustrating an example leakage inductance cancellation block 500 for use with a half-bridge series resonant converter such as the bridge converter 300 of FIG. 3. The half bridge converter includes a switching circuit, as well as, a power input stage a transformer, a bridge rectifier circuit and a power output stage, which are described above in conjunction with FIG. 3. The leakage inductance cancellation block 500 includes a series resonant circuit 530. The series resonant circuit 530 includes a capacitor Cr4 and an inductor 536 that are connected in series. The inductor 536 has an inductance Lr4 and may include a third inductor 532 and a fourth inductor 534. The clamping diodes D1 and D2 may be coupled to a node 539 that is a junction between the third inductor 532 and the fourth inductor 534.

In the inductor 536, poling dots of the third inductor 532 and the fourth inductor 534 may indicate opposite polarity. The fourth inductor 534 may operate as a bucking winding to the third inductor 532. A voltage generated at the third inductor 532 may be reduced by a voltage generated at the fourth inductor 534. At the node 539, a resulting voltage, which is reduced by the voltage across the fourth inductor 534, may be clamped. The resulting voltage may be equivalent to a voltage at a primary winding of an ideal transformer without any effect of leakage inductance. The clamping diodes D1 and D2 may not be affected with a voltage drop across a leakage inductor such as the leakage inductor 210 of FIG. 2 and properly operate under all load conditions. At the node 539, the parallel resonant energy may be returned to a DC input supply on the return line 125, as shown in FIG. 1.

The third inductor 532 may have a number of turns n3+n4 and the fourth inductor 534 may have a number of turns n4. Due to the bucking winding configuration, the third inductor 532 may have a larger number of turns than that of the fourth inductor 534. As a result, the third inductor 532 may carry a full primary current flowing into a transformer such as the transformer 350 (FIG. 3). The fourth inductor 534 may carry only a relatively low current at light load. The relationship between n3 and n4 may be:

$$n4 = (n3+n4) \times Ls/(Lr4+Ls) \qquad (2)$$

where Ls is the leakage inductance and Lr4 is the resonant inductance of the inductor 536. The value n4 may be chosen as an integer for use that is changeable by adding more space between the primary winding and the secondary winding of the transformer.

In the leakage inductance canceling block 500, the fourth inductor 534 may counter the leakage inductance Ls in a path of a main resonant current. As a result, the leakage inductance Ls may not be used as a resonant inductor and the resonant inductance may be produced entirely externally. The inductor 536 may be required to carry a full primary current. The fourth inductor 534 may carry a low primary current at light load.

FIG. 6 is an example leakage inductance canceling block 600 for use with a full bridge implementation such as the example of FIG. 4. The full-bridge series resonant converter includes a switching circuit 620 having four switches S1~S4 rather than the two switches. The bridge converter for use with this leakage inductance canceling block 600 also may provide an improved regulation under all load conditions.

FIG. 7 is an example leakage inductance canceling block 700 for use with a half bridge series resonant converter. The leakage inductance canceling block 700 may include the switch circuit 520, the series resonant circuit 530 and the clamping diodes (D1 and D2), as discussed with reference to FIG. 5. Instead of the third and fourth inductors 532 and 534, the inductor 536 may include a fifth inductor 736 and a sixth inductor 737. The sixth inductor 737 may be moved to the other end of a transformer primary winding. The operation and function may not be changed. The fifth inductor 736 has the number of turns n3+n4 and the sixth inductor 534 has the number of turns n4. The relationship of the number of turns and the operation of the clamping diodes (D1 and D2) are described above in conjunction with FIG. 5. A full bridge implementation for use with the leakage inductance canceling block 700 is also possible.

The series resonant DC-DC converter described above may provide an improved regulation under all load conditions. In particular, at light load, excessive voltage may be avoided; thus, damage to the rectifier circuit at light load may be avoided. The clamping diodes may clamp the voltage at the primary and secondary windings of the transformer. The clamping diodes further may be able to clamp the voltage that is generated across the leakage inductor. This voltage may be invisible for clamping with the leakage inductance canceling block. The inductor of the series resonant circuit may be configured to include an additional winding(s) so that it may synthesize the node representing the simulated voltage across the leakage inductance. The clamping circuit may clamp this voltage and may not experience any improper operation due to the voltage generated at the leakage inductance.

The series resonant DC-DC converter may be implemented with a half-bridge type and/or a full-bridge type. Alternative arrangements of the resonant capacitor and the filter capacitors may not affect the performance of the DC-DC converter.

The clamping circuit and the synthesis of the node may be implemented with simple construction and lower expenses. The performance of the DC-DC converter may be very suitable for audio applications where audio amplifiers and loudspeaker are powered. When audio amplifiers operate at a reduced signal level, the DC-DC converter described above may provide optimal power.

The circuit construction of the DC-DC converters described above is by way of example. Various other constructions and uses of circuit elements are possible. For example, various types of semiconductor devices may be used for the switches and the rectifier circuits. Depending on needs, the output stage may be changed to accommodate more or less channels. In addition, values of the capacitance and inductance may be determined to be suitable for audio amplifier applications.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A series resonant DC-DC converter, comprising:
   a switching stage operable to control a switch to turn on and off according to a predetermined switching cycle, where the switching cycle comprises a first interval that turns on the switch and a second interval that turns off the switch prior to a next switching cycle of another switch;
   a series resonant stage coupled to the switching stage and comprising a capacitor and an inductor connected in series, where the inductor comprises a first inductor and a second inductor that are magnetically coupled to each other;
   a transformer stage comprising a primary winding and a secondary winding, the primary winding connected in series with the series resonant stage;
   a clamping stage coupled to the inductor and placed between the series resonant stage and the transformer stage, the clamping stage operable to clamp an excess voltage, where the excess voltage is a predetermined voltage drop produced by the second inductor; and, an output stage coupled to the secondary winding of the transformer stage and configured to power a load.

2. The converter of claim 1, where the clamping stage comprises a first diode and a second diode that are connected in series.

3. The converter of claim 1, where a voltage across the first inductor is boosted by a voltage across the second inductor.

4. The converter of claim 1, where a voltage across the first inductor is reduced by a voltage across the second inductor.

5. The converter of claim 1, where the predetermined voltage drop is equivalent to a voltage drop of a leakage inductance Ls of the transformer stage.

6. The converter of claim 5, where the first inductor comprises a number of turns n1, the number of turns n1 being determined to supply a resonant inductance Lr included in the series resonant stage and the second inductor comprises a number of turns n2, the number of turns n2 being determined to simulate the voltage drop of the leakage inductance Ls.

7. The converter of claim 6, where the number of turns n2 is determined to be:

$$n2 = n1 \times (Ls/Lr) \quad (1)$$

8. The converter of claim 7, where the number of turns n2 is selected as an integer that is closest to the value of n1×(Ls/Lr).

9. The converter of claim 1, where the first inductor and the second inductor are formed in a single winding.

10. The converter of claim 5, where the first inductor comprises a number of turns n1+n2, the number of turns n1+n2 configured to supply a resonant inductance Lr included in the series resonant stage and the second inductor comprises a number of turns n2, the number of turns n2 being determined to simulate the voltage drop of the leakage inductance Ls.

11. The converter of claim 10, where the number of turns n2 is determined to be:

$$n2 = (n1+n2) \times [Ls/(Lr+Ls)] \quad (2)$$

12. A series resonant DC-DC converter, comprising:
a switching stage operable to control a switch to turn on and off according to a predetermined switching cycle, where the switching cycle comprises a first interval that turns on the switch and a second interval that turns off the switch prior to a next switching cycle of another switch;
a series resonant stage coupled to the switching stage and comprising a capacitor and an inductor connected in series;
a transformer stage comprising a primary winding and a secondary winding, the primary winding connected in series with the series resonant stage;
a clamping stage placed between the switching stage and the transformer stage, the clamping stage operable to clamp an excess voltage;
an output stage coupled to the secondary winding of the transformer stage and configured to power a load; and
a leakage inductance cancellation block operable to produce a predetermined voltage for clamping by the clamping stage, the voltage corresponding to a voltage drop of a leakage inductance of the transformer stage.

13. The converter of claim 12, where the clamping stage comprises at least one diode and the leakage inductance cancellation block comprises an inductor.

14. The converter of claim 12, where the inductor of the series resonant stage comprises the leakage inductance cancellation block.

15. The converter of claim 12, where a resonance inductance of the series resonant stage comprises the leakage inductance.

16. A series resonant DC-DC converter for powering an audio amplifier, comprising:
a transformer comprising a primary winding and a secondary winding, where a leakage inductance and a parasitic capacitance develop in the transformer;
a series resonant circuit comprising a capacitor and an inductor, the inductor comprising a winding operable with a voltage drop that corresponds to a voltage drop of the leakage inductance; and
a diode circuit coupled to the inductor and disposed between the series resonant circuit and the transformer, the diode circuit operable to clamp an excess voltage generated at least in response to the leakage inductance and the parasitic capacitance, where the voltage drop of the inductor is clamped by the diode circuit.

17. The converter of claim 16, where the leakage inductance is configured to be used as a resonant inductance of the series resonant circuit.

18. The converter of claim 17, where the inductor comprises a first winding and a second winding and the second winding is operable with the voltage drop corresponding to the voltage drop of the leakage inductance.

19. The converter of claim 18, where the first winding and the second winding are magnetically coupled to have the same polarity.

20. A series resonant DC-DC converter for powering an audio amplifier, comprising:
a transformer comprising a primary winding and a secondary winding, where a leakage inductance and a parasitic capacitance develop in the transformer;
a series resonant circuit comprising a capacitor and a first inductor, the first inductor comprising a winding operable with a voltage drop that corresponds to a voltage drop of the leakage inductance, where the winding comprises a first winding and a second winding, and the second winding is disposed between the first winding and a second inductor representing the leakage inductance; and
a diode circuit disposed between a switching device and the transformer, the diode circuit operable to clamp an excess voltage generated at least in response to the leakage inductance and the parasitic capacitance, where the voltage drop of the first inductor is clamped by the diode circuit.

21. The converter of claim 20, where the leakage inductance is not a part of a resonant inductance of the series resonant circuit.

22. The converter of claim 20, where the first winding and the second winding are configured to have magnetically opposite polarity.

23. The converter of claim 22, where the first winding has a greater number of turns than that of the second winding such that the first winding carries a primary current.

24. The converter of claim 16, further comprising a switching device enabled and disabled to supply an input voltage, the switching device comprising two switches that are activated alternately.

25. The converter of claim 16, further comprising a switching device enabled and disabled to supply an input voltage, the switching device comprising a first pair of switches and a second pair of switches, where one switch of the first pair and one switch of the second pair are activated substantially simultaneously.

26. The converter of claim 16, further comprising a first bridge rectifying circuit operable to receive an AC voltage and rectify the AC voltage into a DC waveform where the first bridge rectifying circuit is selectively operable as one of a full wave rectifier and a voltage doubler.

27. The converter of claim 26, further comprising a storage capacitor configured to be charged with the rectified AC voltage.

28. The converter of claim 26, further comprising a second bridge rectifying circuit operable to rectify a voltage from the secondary winding of the transformer.

29. The converter of claim 28, further comprising an output filter capacitor operable to filter a high frequency component of the rectified voltage.

30. A method for powering an audio amplifier, comprising:
supplying a driving voltage to turn on a switching device during a switching cycle where the driving voltage becomes zero value at the end of the switching cycle and prior to a start of a next switching cycle;
turning off the switching device at a zero current and turning on the switching device at a zero voltage;
transferring power from a primary side to a secondary side of a transformer;
generating with an inductor positioned on the primary side of the transformer a voltage drop that corresponds to a voltage drop of a leakage inductance of the transformer;
clamping the generated voltage drop; and
supplying the transferred power with the clamped voltage drop to an audio amplifier.

31. The method of claim 30, further comprising:
clamping the voltage drop of the inductor to a determined magnitude.

32. The method of claim 30, further comprising:
forming the inductor to have a first winding with a number of turns n1 and a second winding with a number of turns n2; and
magnetically coupling the first winding and the second winding to have the same polarity.

33. The method of claim 30, further comprising:
forming the inductor to have a first winding with a number of turns n1+n2 and a second winding with a number of turns n2; and
magnetically coupling the first winding and the second winding to have opposite polarity.

* * * * *